US007558781B2

(12) United States Patent
Probst et al.

(10) Patent No.: US 7,558,781 B2
(45) Date of Patent: Jul. 7, 2009

(54) DIGITAL ASSET DATA TYPE DEFINITIONS

(75) Inventors: Bruce E. Probst, Croton-on-Hudson, NY (US); Carl Hixson, Chatham, NJ (US); Anne Moroney, New York, NY (US)

(73) Assignee: Home Box Office, Inc., New York, NY (US)

( * ) Notice: Subject to any disclaimer, the term of this patent is extended or adjusted under 35 U.S.C. 154(b) by 89 days.

(21) Appl. No.: 10/016,679

(22) Filed: Dec. 12, 2001

(65) Prior Publication Data

US 2003/0140034 A1 Jul. 24, 2003

Related U.S. Application Data

(60) Provisional application No. 60/254,991, filed on Dec. 12, 2000.

(51) Int. Cl.
*G06F 17/30* (2006.01)

(52) U.S. Cl. .................. 707/3; 707/4; 707/2; 707/102; 707/104.1; 707/10

(58) Field of Classification Search ..................... 707/3, 707/100, 10.2, 104, 10, 104.1, 102; 705/513, 705/530; 386/52, 56, 55; 715/500, 523, 715/513

See application file for complete search history.

(56) References Cited

U.S. PATENT DOCUMENTS 5,544,354 A * 8/1996 May et al. ................ 707/104.1
5,659,350 A * 8/1997 Hendricks et al. .............. 348/6
5,659,368 A * 8/1997 Landis ....................... 348/467
5,671,409 A * 9/1997 Fatseas et al. ............ 707/104.1
5,675,752 A * 10/1997 Scott et al. .................. 345/866
5,752,244 A * 5/1998 Rose et al. ..................... 707/5
5,857,707 A * 1/1999 Devlin ......................... 283/56
5,895,470 A * 4/1999 Pirolli et al. ................ 707/102
5,907,323 A * 5/1999 Lawler et al. ................. 725/41

(Continued)

FOREIGN PATENT DOCUMENTS

WO WO 00/08909 2/2000

(Continued)

OTHER PUBLICATIONS

Kshitij Shah et al., "Logical Information Modeling Of Web-Accessible Heterogeneous Digital Assets," Research And Technology Advances In Digital Libraries, 1998, ADL 98 Proceedings, IEEE International Forum, pp. 266-275, Apr. 22, 1998.

(Continued)

*Primary Examiner*—Cam Y T Truong
(74) *Attorney, Agent, or Firm*—Jones Day; Garry J. Tuma

(57) ABSTRACT

Data definitions for digital assets, such as, for example, audio, video, photographs, graphics, and electronic documents, are provided that allow these different asset types to be stored in a single database. The definitions are preferably in XML and can be used as a standardized dictionary to more efficiently and economically manage digital-assets, thus improving system interoperability between companies or organizations within a company. A digital asset ordering interface, hardware system, software arrangement, and application interface configuration advantageously using these data definitions are also provided.

3 Claims, 7 Drawing Sheets

U.S. PATENT DOCUMENTS

| | | | | | |
|---|---|---|---|---|---|
| 6,006,332 | A * | 12/1999 | Rabne et al. | 713/201 |
| 6,056,786 | A * | 5/2000 | Rivera et al. | 795/712 |
| 6,065,042 | A * | 5/2000 | Reimer et al. | 709/203 |
| 6,094,649 | A | 7/2000 | Bowen et al. | |
| 6,122,617 | A * | 9/2000 | Tjaden | 704/260 |
| 6,157,931 | A * | 12/2000 | Cane et al. | 707/204 |
| 6,182,029 | B1 | 1/2001 | Friedman | |
| 6,226,675 | B1 | 5/2001 | Meltzer et al. | |
| 6,233,592 | B1 | 5/2001 | Schnelle et al. | |
| 6,236,395 | B1 * | 5/2001 | Sezan et al. | 345/723 |
| 6,240,407 | B1 | 5/2001 | Chang et al. | |
| 6,263,332 | B1 | 7/2001 | Nasr et al. | |
| 6,282,537 | B1 * | 8/2001 | Madnick et al. | 707/4 |
| 6,311,194 | B1 * | 10/2001 | Sheth et al. | 715/505 |
| 6,377,956 | B1 * | 4/2002 | Hsu et al. | 707/104.1 |
| 6,380,950 | B1 * | 4/2002 | Montgomery et al. | 345/723 |
| 6,389,538 | B1 * | 5/2002 | Gruse et al. | 713/194 |
| 6,418,421 | B1 * | 7/2002 | Hurtado et al. | 705/54 |
| 6,487,145 | B1 * | 11/2002 | Berhan | 369/30.15 |
| 6,519,617 | B1 * | 2/2003 | Wanderski et al. | 715/513 |
| 6,538,623 | B1 * | 3/2003 | Parnian et al. | 345/8 |
| 6,584,153 | B1 * | 6/2003 | Gordon et al. | 375/240.13 |
| 6,593,936 | B1 * | 7/2003 | Huang et al. | 345/619 |
| 6,625,810 | B1 * | 9/2003 | Murphy et al. | 725/39 |
| 6,628,303 | B1 * | 9/2003 | Foreman et al. | 345/723 |
| 6,671,732 | B1 * | 12/2003 | Weiner | 709/231 |
| 6,792,577 | B1 * | 9/2004 | Kimoto | 715/235 |
| 7,020,839 | B1 * | 3/2006 | Hosoda | 715/523 |
| 7,028,252 | B1 * | 4/2006 | Baru et al. | 715/500.1 |
| 2003/0058277 | A1 * | 3/2003 | Bowman-Amuah | 345/765 |
| 2004/0249708 | A1 * | 12/2004 | Jacobs et al. | 705/14 |
| 2005/0273459 | A1 * | 12/2005 | Moore et al. | 707/1 |

FOREIGN PATENT DOCUMENTS

| | | |
|---|---|---|
| WO | WO 00/52590 | 9/2000 |

OTHER PUBLICATIONS

Jane Hunter et al., "A Comparison Of Schemas For Video Metadata Representation," Computer Networks, vol. 31, Elsevier Science, pp. 1431-1451, May 17, 1999.

Jayavel Shanmugasundaram et al., "Relational Databases For Querying XML Documents: Limitations And Opportunities," Proceedings Of The 25th International Conference On Very Large Data Bases, Edinburgh, Scotland, pp. 302-314, Sep. 7, 1999.

Mary Fernández et al., "SilkRoute: Trading Between Relations And XML," Computer Networks, vol. 33, Elsevier Science, pp. 723-745, 2000.

* cited by examiner

DIGITAL ASSET DATA TYPE DEFINITIONS

CROSS REFERENCE TO RELATED APPLICATION

This claims the benefit of U.S. Provisional Application No. 60/254,991, filed Dec. 12, 2000.

BACKGROUND OF THE INVENTION

This invention relates to storing, retrieving, and tracking digital data. More particularly, this invention relates to data definitions that allow disparate types of digital assets, such as, for example, photographs, graphics, audio, video, and text documents, to be easily and economically stored, retrieved, and tracked.

Data definitions may be written using XML (extensible markup language). XML is a condensed form of SGML (standard generalized markup language), which is an information management standard that provides documents that retain formatting, indexing, and linked information—independent of application and platform. XML and SGML can be used to organize and present information on the World Wide Web.

Many companies maintain or access large libraries of various audio, visual, and textual assets. Such assets typically include content and metadata. Content may be, for example, still photographs, audio recordings, video recordings, combined audio/video recordings, combined audio/still photograph recordings, graphics, etc. Metadata is "information about information," that is, information used to identify or classify the content. Metadata can include, for example, content titles, version numbers, authors, captions, and other descriptive information relevant to the content.

Such assets are often stored in disparate repositories and on disparate media (e.g. audio and video cassette tapes, motion picture film, photographic negatives, digital video discs, etc.). Accordingly, a significant amount of time is often required to locate a particular asset and then deliver a copy of it. For example, it may take several days to locate and manually copy an audio track stored on a reel-to-reel tape located at a creative services or marketing department of a company in California and then have that copy shipped to a business affairs department or sister company in New York. This process, known as repurposing, is manually intensive and prone to errors. Furthermore, keeping track of asset usage (e.g., who has asset copies) is also a manually intensive process prone to errors. Accordingly, it can cost thousands or even millions of dollars annually for a company to manage such assets.

In an attempt to reduce these costs, some companies store assets digitally in one or more computer databases. These assets can then be retrieved electronically using appropriate software applications. However, known applications are limited. For example, databases are commonly structured to store only one type of digital asset, such as, for example, only photographs. The number, size, and formats of record fields used in the database, characters delimiting the end of files, file size of database records, etc. are all usually customized (and limited) to that one type of asset. Even those few databases that are known to store more than one asset type are also limited with respect to record field definitions and record file size, making them incompatible for use with many other types of digital assets. Such databases are thus impractical for storing a large variety of different types of digital assets.

In sum, storing disparate asset types in a single repository having information and formatting sufficient for identification and retrieval by a single software application or computer platform is not known. Moreover, no standardized definitional dictionary for digital assets is known. Thus, system interoperability between two or more companies or two or more organizations within a company having different types of digital assets is still very difficult.

In view of the foregoing, it would be desirable to be able to provide a standardized dictionary of data definitions for disparate types of digital assets.

It would also be desirable to be able to provide data definitions for application and platform independent search, retrieval, delivery, and tracking of digital assets.

It would further be desirable to be able to provide data definitions that reduce digital asset search time.

It would still further be desirable to be able to provide data definitions that reduce digital asset delivery time.

SUMMARY OF THE INVENTION

It is an object of this invention to provide a standardized dictionary of data definitions for disparate types of digital assets.

It is also an object of this invention to provide data definitions for application and platform independent search, retrieval, delivery, and tracking of digital assets.

It is a further object of this invention to provide data definitions that reduce digital asset search time.

It is a still further object of this invention to provide data definitions that reduce digital asset delivery time.

In accordance with this invention, data definitions are provided for digital assets that include a hierarchical structure that reflects the relationships between attributes and categories of content. These definitions, preferably encoded in XML, can be used as a standardized dictionary to create a digital asset library that is easily and economically manageable. The data definitions are applicable to digital assets of disparate data types and include metadata identifiers sufficient to uniquely identify those digital assets.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention provides data definitions, preferably in XML, for disparate types of digital assets, such as, for example, artwork, logos, photographs, video, graphics, music, still photographs, promotion stills, promos (e.g., an audio or video promotional announcement), tapes, soundtracks, text, video frames (a single image from a video recording), video clips (a group of images from a video recording), and dailies (unedited and unprocessed video or film typically recorded the previous day). Digital assets include content (i.e., the actual asset data) and metadata. Data definitions of the invention advantageously permit a single database to be used for storing, retrieving, and tracking different types of assets whose contents are preferably stored either on the same computer as the database, in the database, on a computer linked to the database via the same network, or combinations thereof. These data definitions allow, for example, employees, affiliates, and customers to relatively easily and economically replicate or transfer assets between repositories where the assets are located and destinations where the assets are currently needed. Furthermore, electronic records can be created to allows usage of those assets to be easily tracked. Thus, the costs associated with managing those assets are significantly reduced.

Figure 1:
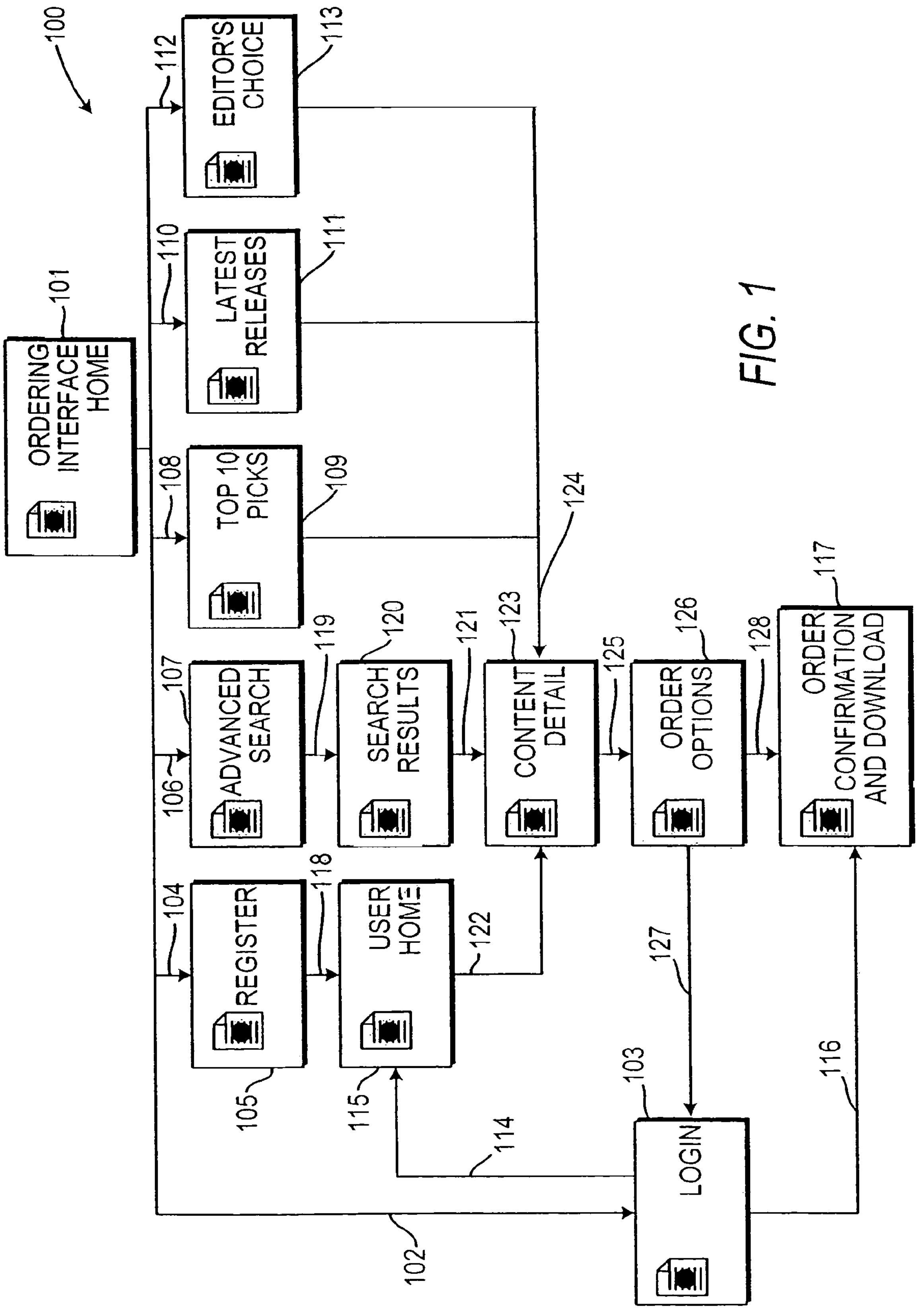
FIG. 1 is a flow chart of an interface for ordering digital assets using data definitions according to the invention.

FIG. 1 shows an interface for searching and ordering digital assets facilitated by the invention. System Home Screen 101 is preferably the first screen a user views when searching for a digital asset (e.g., a video program). While at Home Screen 101, users may enter search criteria before proceeding to another screen. However, this is alternatively not necessary. From Home Screen 101, the user may proceed in one of the following ways: along path 102 to Login Screen 103, along path 104 to Register Screen 105, along path 106 to Advanced Search Screen 107, along path 108 to Top Picks Screen 109, along path 110 to Latest Releases Screen 111, or along path 112 to Editor's Choice Screen 113.

At Login Screen 103, users login to a secured version of a search system associated with interface 100. A user entering Login Screen 103 along path 102 is preferably directed along path 114 to User Home Screen 115 unless the user entered search criteria while viewing Home Screen 101. In that case, the user is preferably directed to Order Confirmation and Download Screen 117 along path 116. Similarly, if the user entered Login Screen 103 along path 127, the user is also preferably directed to Order Confirmation and Download Screen 117.

At Register Screen 105, users register to use the system. Users may be assigned or may freely choose a username, password, and any other relevant identifying information. Users may be prompted by Register Screen 105 to enter information deemed relevant or necessary by the system. After registering, users are preferably directed along path 118 to User Home Screen 115.

At Advanced Search Screen 107 users enter or are given pre-defined criteria with which the database of the invention can be searched. Screen 107 preferably allows users to generate advanced search criteria including, but not limited to, searching specific strings, numeric values, fields or combinations of fields containing data, as well as allowing users to define complex or simple search expressions using boolean or other logic, wildcards, multiple search criteria, or any other type of search functionality. Preferably, upon an indication by a user or upon a pre-defined system event (for example, expiration of a timer), a user will be directed along path 119 to Search Results Screen 120.

At Top Picks Screen 109, a user can view and select from a subset of assets defined in the database. This subset may be predefined by the user, the system, or a system administrator. The subset may be defined as the most viewed assets, most searched for assets, most retrieved assets, most popular assets, or top assets based on a criteria defined by a user, the system, or an administrator.

At Latest Releases Screen 111, a user can view and select from a subset of assets in the database This data is preferably a subset of the most recently added assets in the database. However, the subset may be defined as the most recently released assets, most recently produced assets, or any other desired subset of data in the database.

At Editor's Choice Screen 113, a user can view and select from a subset of assets defined in the database. This subset is preferably a selection of assets that one or more editors, within the company or organization viewing or providing the database, has selected as being desirable for viewing based on one or more criteria defined by the editors.

At User Home Screen 115, a user can view personalized or standard information relating to that user's usage of the database. The system may present the user with search possibilities, the ability to view some subset of assets defined in the database, a listing of data that may be useful in some respect, and any other relevant information or functional possibilities. Preferably, upon an indication by a user or upon a pre-defined system event (for example, expiration of a timer), the user is directed along path 122 to Content Detail Screen 123.

At Search Results Screen 120, a user can view and select from a subset of data retrieved in accordance with criteria defined by the user while viewing Advanced Search Screen 107 and possibly in accordance with one or more database enforced criteria. Upon indicating a selection of one or more assets, a user is directed along path 121 to Content Detail Screen 123.

In addition to being directed along path 121 or 122 as described, a user may be directed along path 124 from any of screens 109, 111, or 113 to Content Detail Screen 123. A user may be automatically directed to screen 123 if a small number of asset definitions are the only items the user wishes to view. For instance, if a user performs a complex search and the system finds only one asset satisfying the search criteria, the system may automatically bypass Search Results Screen 120 and display Content Detail Screen 123.

At Content Detail Screen 123, a user can view all or part of the summary data directly related to one or more items selected manually or automatically by the user. Preferably, upon an indication by the user or upon a pre-defined system event (for example, expiration of a timer), a user is directed along path 125 to Order Options Screen 126.

At Order Options Screen 126, a user can view and select from options related to ordering and downloading data for which summary data was viewed while viewing Content Detail Screen 123. These options may include billing, routing, formatting, data transmission, delivery date, delivery time, and other relevant options. Upon indication by a user or upon a pre-defined system event, the user is directed along path 127 to Login Screen 103 or along path 128 to Order Confirmation And Download Screen 117. Preferably, a user is directed along path 127 when the user has not logged in using Login Screen 103. Alternatively, a user is directed along path 128 when the user had previously logged in via Login Screen 103. In some systems, logging in is not necessary. In other systems, a user that has logged in but has not taken any decisive action (for instance, has not made an indication at Order Options Screen 126 within a specified amount of time after logging in) is directed along path 127.

At Order Confirmation And Download Screen 117 the system preferably displays details and summary information relating to an asset that was ordered by a user. The user is preferably presented with the opportunity to download or retrieve the asset. Such retrieval may be performed either electronically or by using devices (such as printers, tape recorders, compact disc writers, digital video disc writers, or other recording or printing equipment) to convert an asset stored in a database or in an associated or networked computer memory to a digital or analog item stored in another manner.

Note that any of paths 102, 104, 106, 108, 110, 112, 114, 116, 118, 119, 121, 122, 124, 125, or 128 may be traversed in reverse by users that wish to step backwards in the search and ordering process. Also, securing the search system is not a necessary function of the invention. Note further that all of interface 100 is not necessary for implementing the invention; an interface employing even a very small subset of interface 100 can benefit from the invention. Moreover, additional process paths and functionality (for instance, paths connecting any of screens 109, 111, 113, 115, and 123 directly to Search Results Screen 120 to allow a user to view search results from a search performed while viewing any of those screens) can be added to interface 100.

In sum, the data definitions of the invention enable systems using interface 100 or similar interfaces to provide satisfactory interactive search and response times to users.

Figure 2:
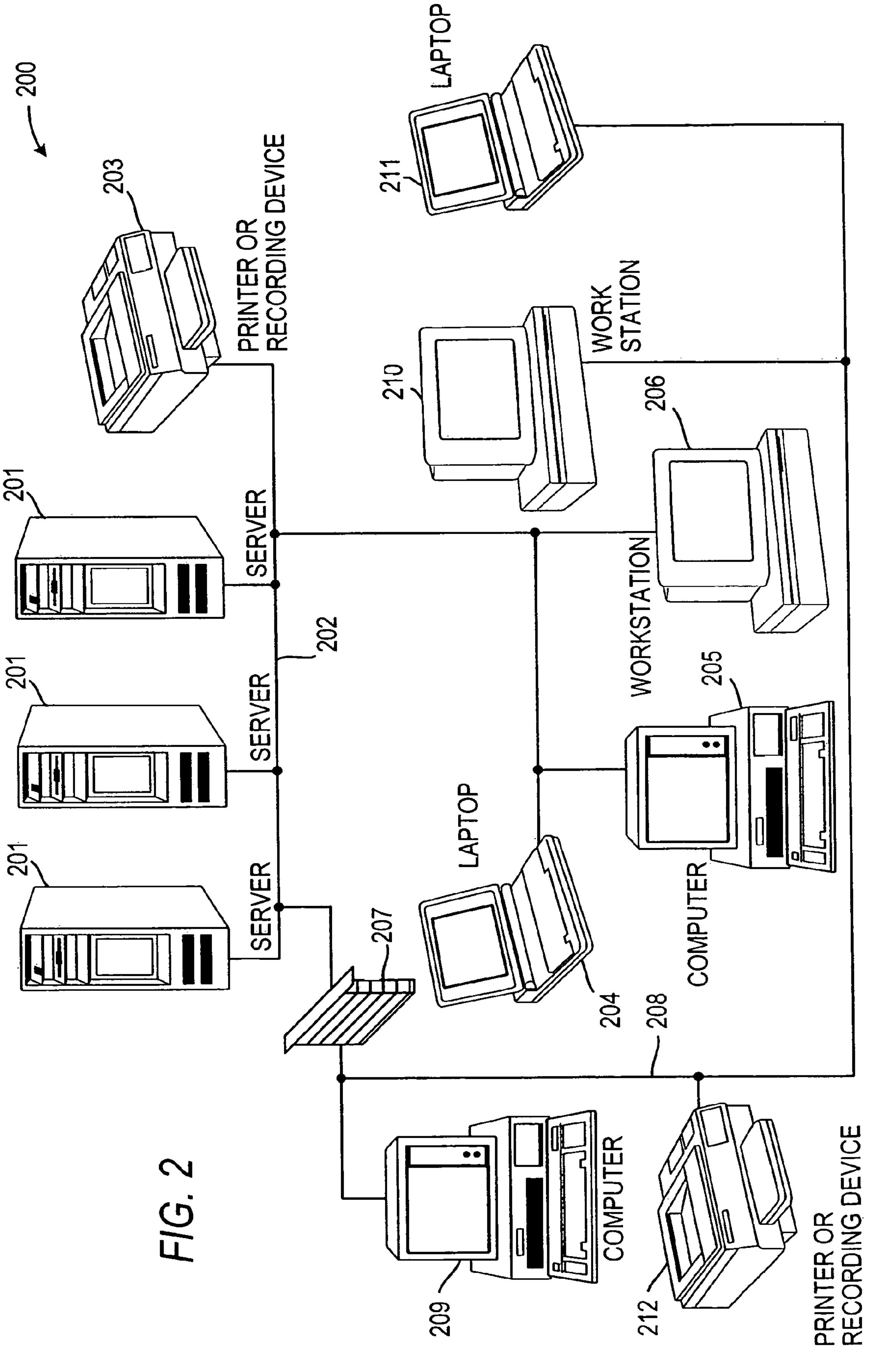
FIG. 2 is a block diagram of an embodiment of a hardware system within which the invention can be used.

FIG. 2 shows a hardware system 200 that can be used to manage digital data defined with data definitions in accordance with the invention. System 200 preferably includes one or more servers 201, a secure transmission line 202, at least one secure recording or printing device 203, one or more secure access devices (e.g., laptop 204, computer 205, and workstation 206), at least one firewall 207, one or more non-secure transmission lines 208, one or more non-secure access devices (e.g., computer 209, workstation 210, and laptop 211), and at least one non-secure recording or printing device 212.

One or more servers 201 store all or part of one or more databases. Servers 201 may be accessed via secure transmission line 202 by secure access devices 204-206 or by firewall 207 which has received appropriate indications from non-secure access devices 209-211 via non-secure transmission line 208. Upon receiving appropriate indications from devices 204-206 or firewall 207, servers 201 transmit data to devices 204-206, firewall 207, or recording or printing device 203, as appropriate, via secure transmission line 202.

Upon receiving appropriate indications (based on security criteria), firewall 207 transmits data to non-secure access devices 209-211 or non-secure recording or printing device 212, as appropriate, via non-secured data transmission line 208.

Secure access devices 204-206 and non-secure access devices 209-211 can include laptop computers, desktop computers, and workstations (as shown), as well as other types of terminals, wireless devices, personal digital assistants (PDAs), television set-top boxes, other databases, and other digital devices that can receive user indications and can communicate with servers or firewalls.

Severs 201 can be, for example, Sun® servers using the Solaris® platform, Oracle database servers, or any other appropriate server platform. Transmission lines 202 and 208 may use T-1, T-2, or any other appropriate transmission standards. Alternatively, the invention can be practiced with a configuration as simple as a single computer that can do the following: store and query a database in its RAM, ROM, hard disk drive, compact disc, floppy disk, or other suitable storage medium; display visual or play audio content; and receive user indications.

Figure 3:
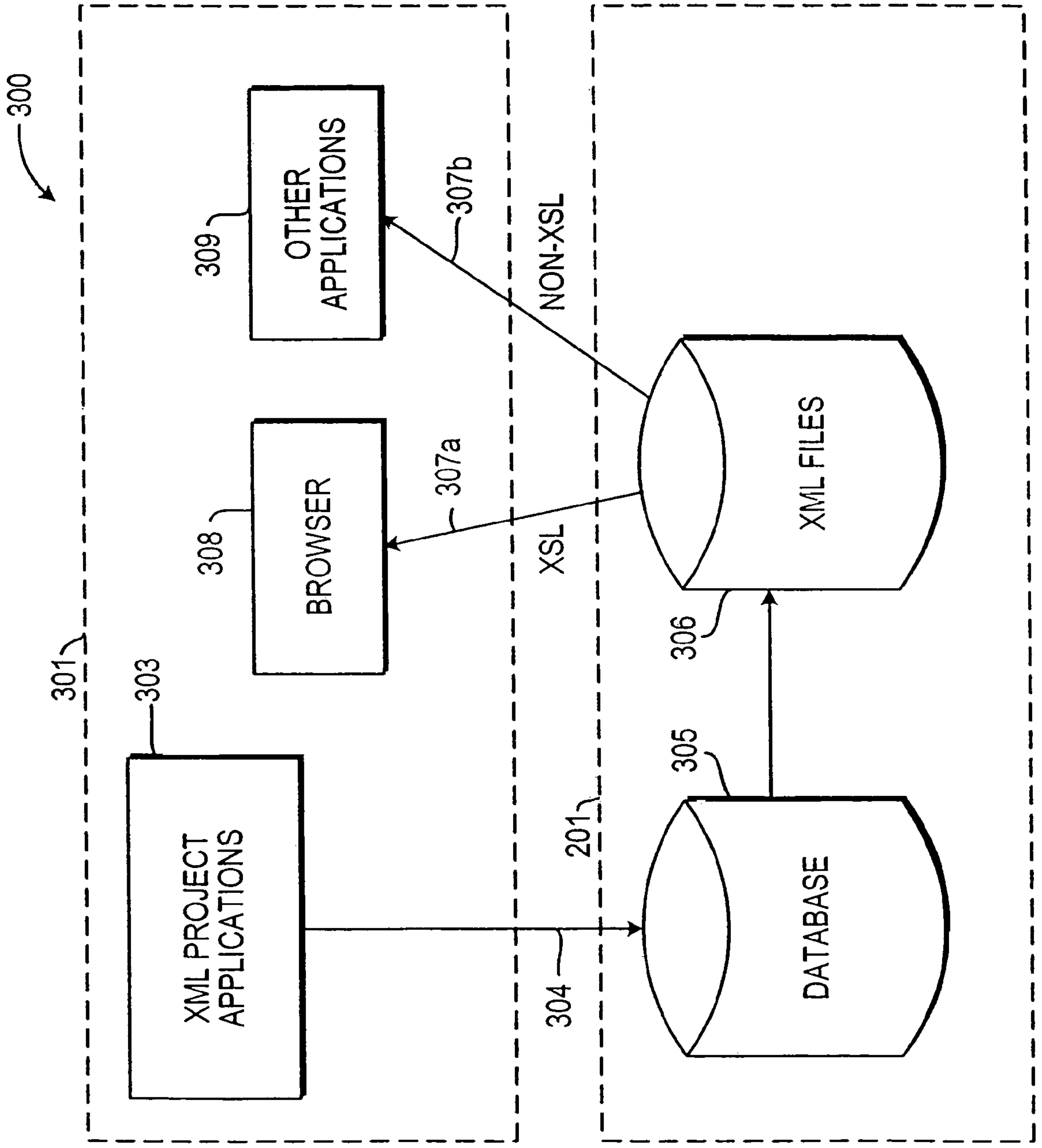
FIG. 3 is a block diagram of an embodiment of integrated software according to the invention.

FIG. 3 shows an embodiment of integrated software according to the invention. Computer 301 (which may be any of secure access devices 204-206, firewall 207, and non-secure access devices 209-211) communicates with servers 201. Project applications 303, which are preferably encoded in XML, transmit a demand 304 for database information to database 305. Database 305 may be, for example, Oracle®, Sybase®, Microsoft Access®, or any other relational or non-relational database package. Database 305 creates preferably XML files 306. An example of an XML file 306 is shown in Example 2 below. XML files 306 are transmitted in. HTML format 307*a* for viewing graphics with a browser 308. Microsoft Internet Explorer® and Netscape Navigator® are two examples of browsers that may be used. Preferably, format 307*a* is HTML with cascading style sheets (CSS).

Alternatively, XML files 306 may be transmitted in XML format 307*b* for use by other applications 309, such as, for example, C, C++, or Java applications that may be for a stand-alone screen, front-end GUI, or Web presentation package. Alternative format 307*b* may include XML with CSS for further processing by applications such as search engines or bots or may include regular HTML if a still or active display is the only output requirement. Bots are programs that typically perform repetitive or time consuming tasks on a network (e.g., searching Web sites on the Internet). Examples of formats 307*a* and 307*b* are shown below in Examples 3a-c.

Figure 4:
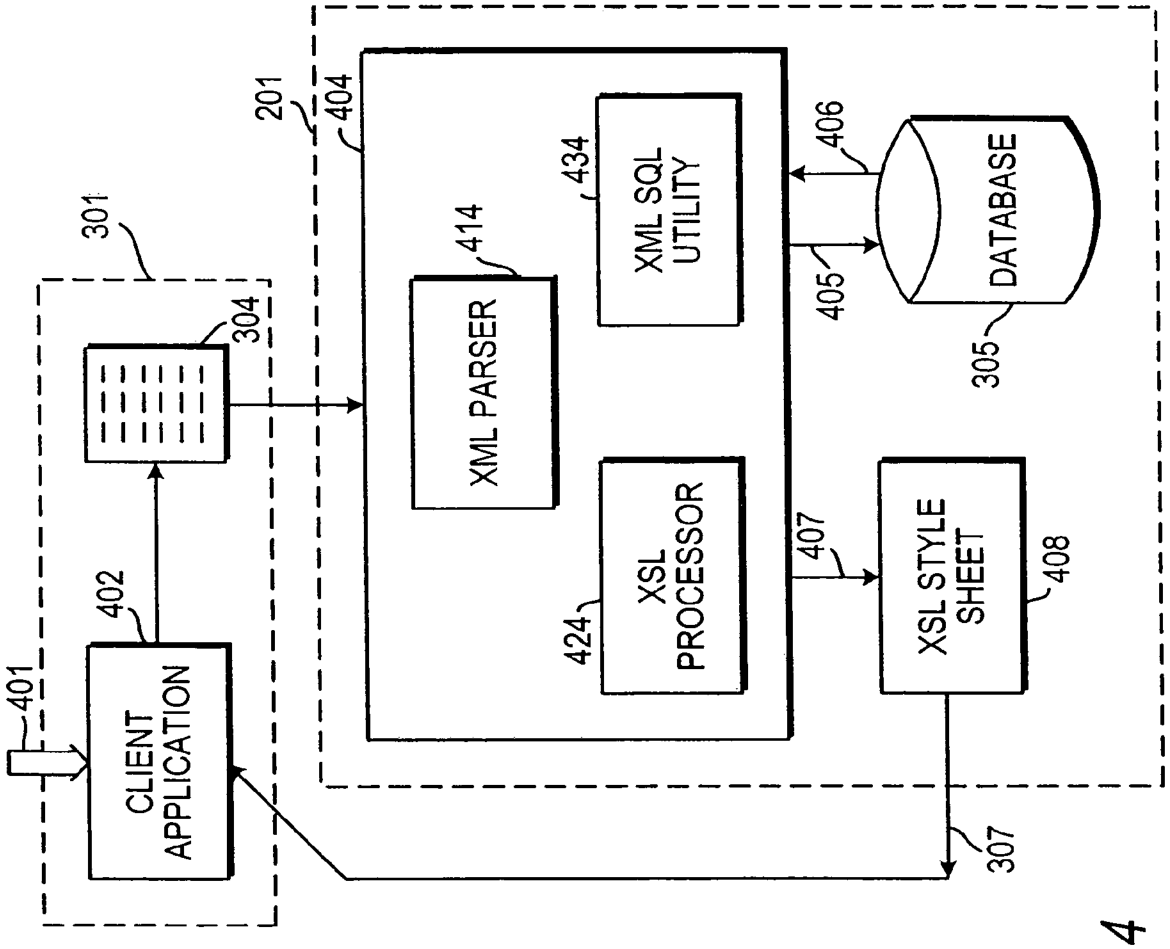
FIG. 4 is a block diagram of an embodiment of an application interface configuration according to the invention.

FIG. 4 shows an embodiment of an application interface configuration in accordance with the invention. In this configuration, a user provides search parameters 401 to client application 402, which is active on computer 301. Client application 402 converts search parameters 401 into a demand 304 for database information. Demand 304 may take the form of an SQL (structured query language) query when database 305 is an SQL-based relational database. Preferably, however, server 201 processes demand 304 in a server application 404. Server application 404 preferably includes the following modules; an XML parser 414, an XSL processor 424, and an XML-SQL utility 434. XSL (extensible style sheet language) is a language for specifying style sheets that apply formatting to complex XML data for presentation in HTML and other formats. XSL can map a single XML element to more than one type of display object (e.g., both an element in a list and an item in a table). A style sheet is a text file containing code to apply semantics such as page layout specifications to an HTML document.

After converting demand 304 to SQL format (if necessary depending on the database), application 404 sends query 405 to database 305. Database 305 processes query 405 and returns search results 406 to application 404. Application 404 then processes results 406 to create one or more XML files. These XML files are sent by application 404 as data 407 to XSL style sheet 408. XSL style sheet 408 processes data 407 and returns a response 307 in format 307*a* or 307*b*, as appropriate. Client application 402 then converts response 307 into a format that can be heard or viewed by the user.

Figure 5:
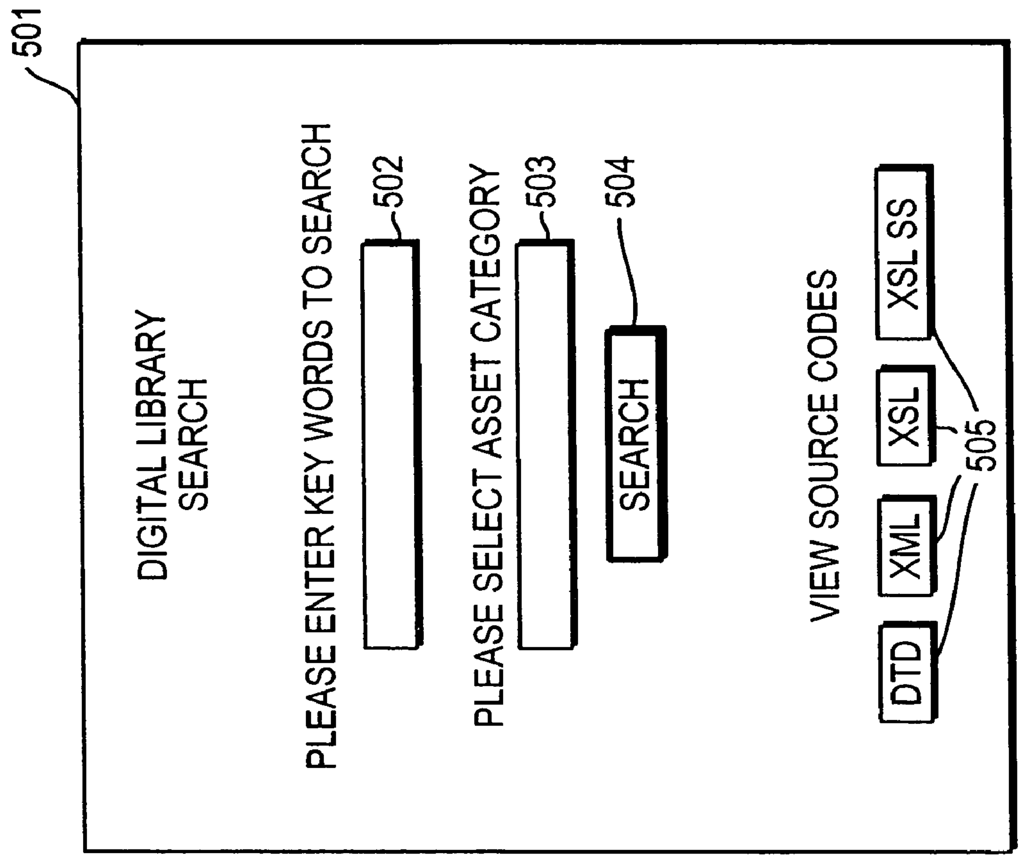
FIG. 5 shows an embodiment of a display screen for asset searching according to the invention.

FIG. 5 shows an example of a display that can be used as Advanced Search Screen 107. Illustrative display 501 includes interactive features 502, 503, 504, and 505. Display 501 may alternatively include more or less interactive features as appropriate for a given implementation of the invention. Interactive feature 502, entitled "PLEASE ENTER KEYWORDS TO SEARCH," accepts user entries of keywords or phrases to be used by XML project applications 303 when forming demand 304. For example, "Oscar belt" may be entered via interactive feature 502 by a user searching for a picture that has metadata containing the description, "Oscar Delahoya wearing a championship belt." Interactive feature 503, entitled "PLEASE SELECT ASSET CATEGORY," accepts user entries for the type of asset to retrieve. For example, possible asset types are photos, audio, video, text, any combination of these, or any other appropriate asset type. Interactive feature 504, entitled "SEARCH," allows users to submit a search request (i.e., have application 303 form a demand 304). Interactive features 505, entitled "DTD," "XML," "XSL," and "XSL SS," allow a user to select a source code format in which to view data instead of viewing a composes video screen or hearing a composed audio output.

Figure 6:
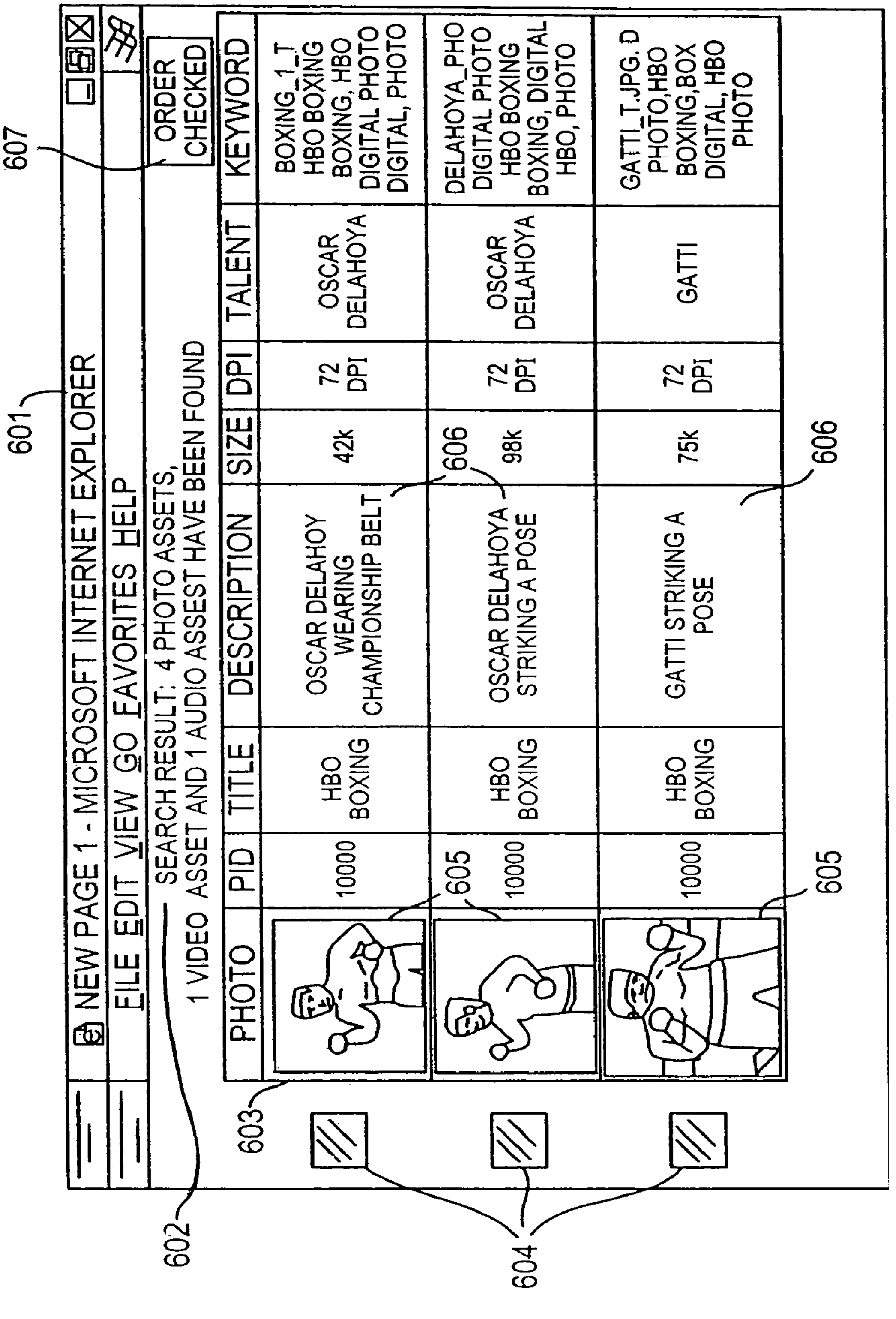
FIG. 6 shows an embodiment of a display screen for search results according to the invention.

FIG. 6 shows an example of a display that can be used as Search Results Screen 120. In this example, illustrative display 601 indicates at 602 that 4 photo assets, 1 video asset, and 1 audio asset had been found, and shows at 603 a list of photographic assets, that met the criteria of a demand 304. Illustrative display 601 preferably includes features 604, 605, 606, and 607. Alternatively, display 601 can include more or less features as desired for a given implementation of the invention. Features 604 interactively accepts user indications of selection or rejection of assets from the displayed list of assets. Features 605 may be interactive (e.g., a button) or static (e.g., just a display). In this example, feature 605 displays an image of the assets associated with the retrieved list items. If feature 605 is interactive, it can accept a user's selection of an asset to be ordered. Feature 606 displays descriptive information associated with the assets that met the criteria of demand 304. Feature 606, like feature 605, may be interactive to accept user selections of an asset. Feature 607, entitled "ORDER CHECKED," is interactive and accepts indications that a user has finished selecting assets and is ready to proceed along path 121 to Content Detail Screen 123.

Figure 7:
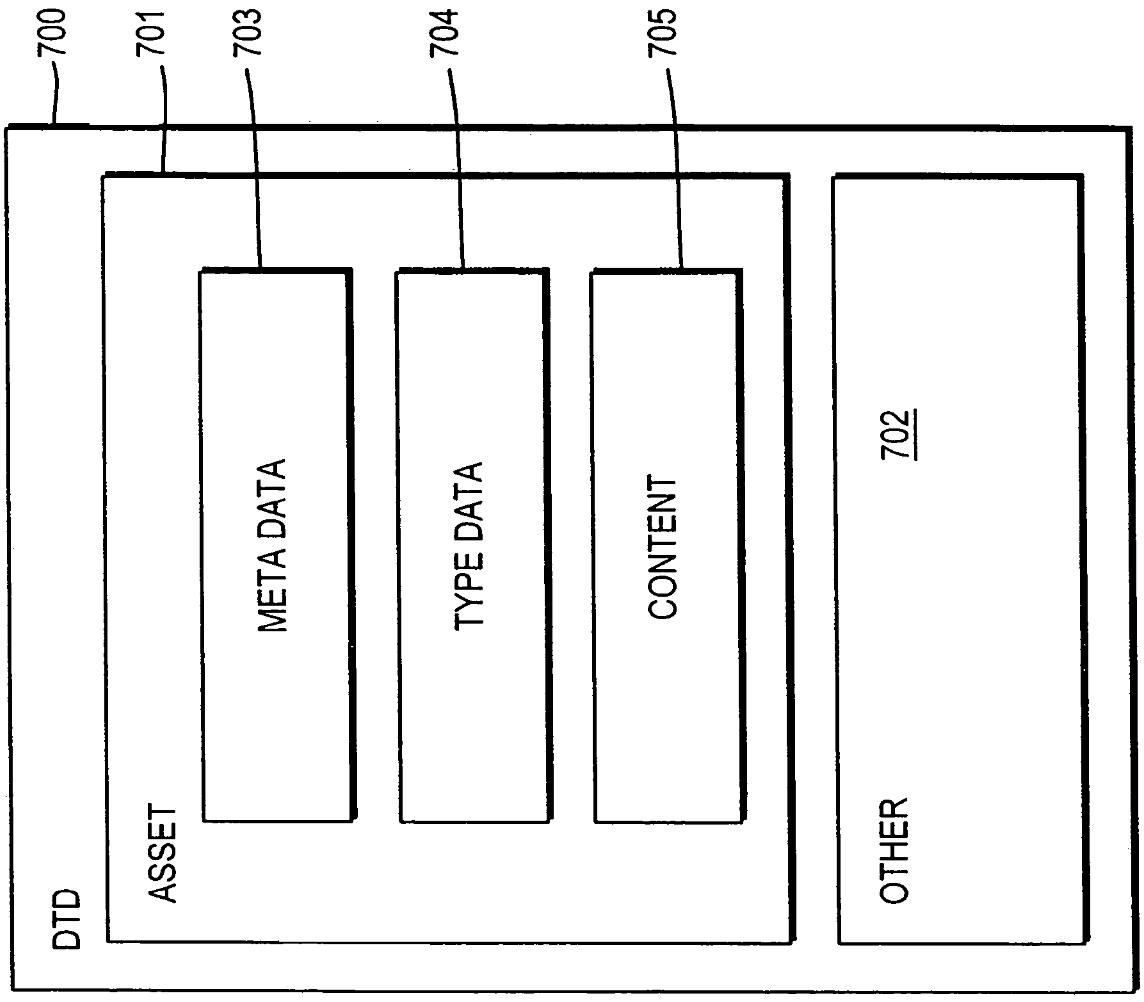
FIG. 7 is a high level block diagram showing an embodiment of a document type definition (DTD) for digital assets according to the invention.

FIG. 7 shows an embodiment of a document type definition (DTD) in accordance with the invention. A DTD is a separate file or document that contains formal definitions of all the data elements in a particular type of XML (or HTML or SGML) document, such as a report or a book. By consulting the DTD for a document, a program called a parser (e.g., XML parser 414) can work with the markup codes that the document contains. DTD 700 includes asset element 701, which defines the type of data to be stored for each digital asset. DTD 700 may also include one or more other data elements 702 for other uses. For example, asset element 701 can contain a core set of definitions, while data element 702 can contain additional definitions that augment the core set in cases where such additional definitions are required by a particular user.

Asset element 701 preferably includes asset metadata 703, asset type data 704, and asset content 705. Asset element 701 may also include additional definitional information as desired. Asset metadata 703 preferably includes the following definitional elements: product identifier (ID) (e.g., a video program name), version ID, inventory ID, and ownership rights ID. Asset metadata 703 can also include any subset of these identifiers or any additional identification information.

Asset type data 704 advantageously can include any number of definitional elements relevant to a particular type of asset. Table 1 is a preferred embodiment of asset type data 704 in accordance with the invention, showing definitional elements for classifying five asset types:

TABLE 1

| ASSET TYPE → | Photo | Movie | Audio | Promo | Voiceovers |
|---|---|---|---|---|---|
| Metadata | Ad Slick | Version | Music | On-Line edit | Announcer |
| | Agency | Rating | Stock | Airmaster # | Session Date |
| | Approved | Minutes | Library | EE Master # | 1st air date |
| | Archive | Seconds | Sub Library | Textless # | Residual payment |
| | Art Director | Date | CD # | Writer/ Producer | Production company |
| | Black/White | AKA Title | CD Title | Duration | Agency |
| | Box ID | Type | Track Title | Music | Telephone # |
| | Caption | Genre | Duration | Announcer | Fed ID# |
| | Character | Caption | Composer | Cut versions | Address |
| | Client | Title | Publisher | Graphics | |
| | Color | Licensor | Society | Promo Dub | |
| | Comments | Release Date | | Shoot Material | |
| | Discard Date | Rating | Original | EPK | |
| | Entry Date | Foreign Lang. | Code | Trailer | |
| | Storage Date | Run Time | Title | Kill Date | |
| | Department | Color/BW | Duration | Comments | |
| | Final art | Director | Session DT | DAT | |
| | Job number | Cast | Composer | Script | |
| | Licensor | Brief Synopsis | Publisher | EDL | |
| | Off-site storage | P Version Format | Society | Screening notes | |
| | Photographer | Synopsis | Rights Issues | Internet rights | |
| | Product ID | Product ID | Contract (lic.) | | |
| | Poster Art | Version ID | Internet | | |
| | Press Kit | Contract ID | International | | |
| | Version ID | Run code | Library Contact | | |
| | Project Number | SAP | | | |
| | Resolution | | | | |
| | Restrictions | | | | |
| | Shoot date | | | | |
| | Talent | | | | |
| | Title | | | | |

Note that the elements defined in Table 1 are illustrative and thus are neither required nor exclusive of other elements.

Asset content 705 preferably includes one of the following: digitally encoded asset data, a link to a file containing asset data, or a reference to a location where asset data is digitally stored. Alternatively and less preferable, multiple copies of a digital asset can be referenced or included in asset content 705.

An embodiment of DTD 700 for digital assets, which includes asset element 701, asset metadata 703, asset type data 704, and asset content 705, is shown below in Example 1 in accordance with the invention.

EXAMPLE 1

<! -DTD FOR DIGITAL ASSETS ->
<! -Digital Library Data Definition ->
<! -Supporting technologies include but not limited to XML, XSL, XSLT, XPATH, DTD Schema->

| | | | |
|---|---|---|---|
| <!ELEMENT | digitalAsset (assetMetadata, movieTitleMetadata?, rightsMetadata, transactionMetadata?, Photo*, Promo*, Audio*, Movie*,)> | | |
| <!ELEMENT | assetMetadata (#PCDATA)> | | |
| <! ATTLIST | assetMetadata | | |
| AssetTitle | CDATA | #IMPLIED | this asset package has a name |
| AssetComments | CDATA | #REQUIRED | comments/description about the asset group |
| AssetVersion | CDATA | #REQUIRED | version, major + minor |
| AssetCreateDate | CDATA | #REQUIRED | create date |
| > | | | |
| <!ELEMENT | movieTitleMetadata (#PCDATA)> | | |
| <! ATTLIST | movieTitleMetadata | | |
| PID | CDATA | #REQUIRED | product id; link to PRIME.PPROD |
| VID | CDATA | #REQUIRED | PEG--version id; LINK TO prime/pversion__general |
| RID | CDATA | #REQUIRED | rights id, for FUTURE use |
| Genre | CDATA | #REQUIRED | PEG genre, may be several genres [ ] FUT make multiple elements? |
| Rating | CDATA | #REQUIRED | PEG MPAA information |
| movieTitleLong | CDATA | #REQUIRED | PEG the movie title, full name with all punctuation |
| movieTitleShort | CDATA | #REQUIRED | PEG abbreviated movie title, suitable for computer filenames; no blanks, special chars |
| movieTitleAKA | CDATA | #IMPLIED | alternate movie name; different countries |
| StudioProvider | CDATA | #IMPLIED | PEG--copyright owner or provider of tape |
| Director | CDATA | #REQUIRED | PEG--movie director |
| Cast | CDATA | #REQUIRED | PEG cast members, talent [ ] FUT make multiple elements? |
| SynopsisBrief | CDATA | #REQUIRED | PEG short description |
| SynopsisLong | CDATA | #REQUIRED | full description |
| Languages | CDATA | #REQUIRED | PEG languages; may be several on many tracks; [ ] FUT make multiple elements? |
| movieComments | CDATA | #REQUIRED | transmission commentary information |
| movieCreateDate | CDATA | #REQUIRED | PEG needs year creation date |
| movieRun__Time | CDATA | #REQUIRED | PEG hh:mm |
| movieRun__Time-Status | CDATA | #REQUIRED | estimated or actual |
| movieRunTimeMinutes | CDATA | #IMPLIED | RunTime minutes |
| movieRunTimeSeconds | CDATA | #IMPLIED | RunTime seconds |
| Run__Code | CDATA | #IMPLIED | (ex. 2:02 HA) |
| Run__Code__Type | CDATA | #IMPLIED | can include codes indicating type of encoding etc. |
| Color/BW | CDATA | #IMPLIED | black & white or color |
| Caption | CDATA | #IMPLIED | caption or description information |
| Keywords | CDATA | #IMPLIED | digital library query data for file retrieval |
| > | | | |
| <!-Rights Management Structure-> | | | |
| <!ELEMENT | rightsMetadata (#PCDATA)> | | |
| <! ATTLIST | rightsMetadata | | |
| CID | CDATA | #REQUIRED | contract id |
| Amend__No | CDATA | #IMPLIED | contract amendment number |
| Ravi__ID | CDATA | #IMPLIED | rights availability window id |
| Start__Date | CDATA | #IMPLIED | PEG start of availability |
| End__Date | CDATA | #IMPLIED | PEG end of availability |
| No__of__Plays | CDATA | #IMPLIED | allowed number of plays per agreement |
| Usage__Allowed | CDATA | #IMPLIED | extra restrictions (ex. Rewind, pause, fast forward) |
| Fee | CDATA | #IMPLIED | transaction fee |
| Authorized__Zone | CDATA | #IMPLIED | geography or person |

-continued

| | | | |
|---|---|---|---|
| <! -DTD FOR DIGITAL ASSETS -> | | | |
| <! -Digital Library Data Definition -> | | | |
| <! -Supporting technologies include but not limited to XML, XSL, XSLT, XPATH, DTD Schema-> | | | |
| World__Wide__Rights | CDATA | #IMPLIED | yes or no |
| Music__Effects | CDATA | #IMPLIED | yes or no (ex. train crash, explosion) |
| Licensor | CDATA | #IMPLIED | copyright holder |
| Coypright__Year | CDATA | #IMPLIED | year of copyright |
| > | | | |
| <!-Transaction Metadata Structure-> | | | |
| <!ELEMENT | transactionMetadata (#PCDATA)> | | |
| <! ATTLIST | transactionMetadata | | |
| Trans__ID | CDATA | #REQUIRED | transaction id |
| Trans__Type | CDATA | #IMPLIED | type of transaction |
| Trans__Date | CDATA | #IMPLIED | date of transaction |
| Trans__User__ID | CDATA | #IMPLIED | transaction author |
| > | | | |
| <!-Digital Photo Metadata Structure-> | | | |
| <!ELEMENT | Photo (photoMetadata, transactionMetadata)> | | |
| <!ELEMENT | photoMetadata (#PCDATA)> | | |
| <! ATTLIST | photoMetadata | | |
| <!-Baseline - Information Required fields-> | | | |
| BID | CDATA | #REQUIRED | base ID |
| Form__DigitalAsset | CDATA | #REQUIRED | photographs, graphics, location stills, or royalty fee |
| Orig Creation Date | CDATA | #REQUIRED | original creation date of digital photo asset (date field) |
| Resolution Type | CDATA | #REQUIRED | |
| <!-Production Information (extracted from PRIME)-> | | | |
| Film/Series/Program__Title | CDATA | #IMPLIED | program title associated with photograph |
| Orig Broadcast Date | CDATA | #IMPLIED | original broadcast date of film or series (date field extracted from PRIME) |
| Orig Broadcast Season | CDATA | #IMPLIED | original broadcast season of program or series |
| Orig Release Date | CDATA | #IMPLIED | original release date of program or series |
| Film/Series__Creation Date | CDATA | #IMPLIED | original creation date of film or series (date field) |
| Original Copyright Year | CDATA | #IMPLIED | copyright year (date field |
| Film/Series__Version | CDATA | #IMPLIED | version control information |
| Film/Series__Origin | CDATA | #IMPLIED | origin of film or series (e.g. HBO Theatrical) |
| Description__Blurb | CDATA | #IMPLIED | description information extracted from PRIME |
| Form__Program | CDATA | #IMPLIED | program type (e.g. Movie) |
| Genre | CDATA | #IMPLIED | program style (e.g. Romance, Drama, Comedy) |
| Rating | CDATA | #IMPLIED | program rating (e.g. R, PG) |
| FilmSeries__Director | CDATA | #IMPLIED | director of film or series |
| Film/Series__Writer | CDATA | #IMPLIED | writer of film or series |
| Film/Series-Producer | CDATA | #IMPLIED | producer of film or series |
| Film/Series__Cast Talent | CDATA | #IMPLIED | film or series cast and talent information |
| FilmSeries__Production Executive | CDATA | #IMPLIED | production executive |
| Film/Series Programming Executive | CDATA | #IMPLIED | programming executive |
| <!-Photograph Content Information-> | | | |
| Cast/Talent__Photo | CDATA | #IMPLIED | cast or talent that appear in photograph |
| Crew Name__Photo | CDATA | #IMPLIED | crew that appear in photograph |
| Crew Position__Photo | CDATA | #IMPLIED | crew position (e.g. Director, Producer, Writer) |
| Origin__Photo | CDATA | #IMPLIED | origin of photo (e.g. Warner Brothers, United Artist, Sports Illustrated) |
| Agency | CDATA | #IMPLIED | creative agency information |
| Art Director__Photo | CDATA | #IMPLIED | Art Director information |
| Photographer | CDATA | #IMPLIED | Photographer information |
| Requesting Department | CDATA | #IMPLIED | division requesting digital content |
| Request Date | CDATA | #IMPLIED | date of request for digital asset (date field) |
| <!-Physical Photograph Information-> | | | |
| Orig Photo ID | CDATA | #IMPLIED | barcode information from photo label |
| Orig Photo Medium | CDATA | #IMPLIED | (e.g. negative, print, transparency) |
| Orig Photo Location | CDATA | #IMPLIED | location of photo in physical archive |

-continued

<! -DTD FOR DIGITAL ASSETS ->
<! -Digital Library Data Definition ->
<! -Supporting technologies include but not limited to XML, XSL, XSLT, XPATH, DTD Schema->

| | | | |
|---|---|---|---|
| Orig Photo Archive Date | CDATA | #IMPLIED | original archive date of photo (date field) |
| Orig Photo Archive Box Number | CDATA | #IMPLIED | original box number from physical file |
| <!-General Information-> | | | |
| DID | CDATA | #IMPLIED | digital asset id. link to Artesia UO!__ID__ |
| Shoot Type | CDATA | #IMPLIED | type of photographic shoot (e.g. gallery, location still, acquisition) |
| Color | CDATA | #IMPLIED | color space of digital photo (e.g. black & white color) |
| Description | CDATA | #IMPLIED | description of digital photograph subject matter |
| Comments | CDATA | #IMPLIED | general comments |
| Ready for Rights | CDATA | #IMPLIED | yes or no |
| Input Date | CDATA | #IMPLIED | date of ingestion into Digital Library system (date field) |
| Input By | CDATA | #IMPLIED | name of person responsible for uploading asset into Digital Library |
| Last Updated Date | CDATA | #IMPLIED | date of last update or modification (date field) |
| Last Updated By | CDATA | #IMPLIED | person responsible for last update or modification |
| <!-Rights Information-> | | | |
| Asset Copyright Year | CDATA | #IMPLIED | digital asset year of copyright |
| Asset Copyright Holder | CDATA | #IMPLIED | digital asset copyright holder |
| Restrictions__Legal | CDATA | #IMPLIED | legal restrictions associated with digital asset |
| Restrictions__Photographer | CDATA | #IMPLIED | photographer restrictions associated with digital asset |
| Restrictions__Exclusives | CDATA | #IMPLIED | yes or no |
| Exclusives Held Until | CDATA | #IMPLIED | expiration of exclusive condition linked to digital asset (date field) |
| Restrictions__License Limitations | CDATA | #IMPLIED | licensing limitations or restrictions associated to digital asset |
| Legal Contact | CDATA | #IMPLIED | legal contact for information regarding digital content usage |
| Availability End Date | CDATA | #IMPLIED | date when digital asset is no longer available for usage (date field) |
| Rights Input Date | CDATA | #IMPLIED | date digital rights entered into Digital Library system (date field) |
| Rights Input By | CDATA | #IMPLIED | person entering digital rights info into Digital Library system |
| Rights Last Updated Date | CDATA | #IMPLIED | date rights information was last upgraded or modified (date field) |
| Rights Last Updated By | CDATA | #IMPLIED | person responsible for last update or modification of rights info |
| <!-Digital Photograph Information-> | | | |
| Filename | CDATA | #IMPLIED | name of digital file assigned by scanning technician (e.g. sopranos.jpg) |
| Format | CDATA | #IMPLIED | file format (e.g. JPEG, TIFF, PPT) |
| Physical Location | CDATA | #IMPLIED | archival location of original transparency or print |
| Server Location | CDATA | #IMPLIED | location of digital asset storage system |
| Digitizing Date | CDATA | #IMPLIED | date digital asset was scanned (date field) |
| Creator | CDATA | #IMPLIED | name of person creating the digital file (e.g. scanning technician) |
| Filesize | CDATA | #IMPLIED | size of digital file (KB/MB) |
| Mode | CDATA | #IMPLIED | color space (e.g. RGB, CMYK, Grayscale) |
| Height__Inches | CDATA | #IMPLIED | height of digital image (inches) |
| Width__Inches | CDATA | #IMPLIED | width of digital image (inches) |
| Height__Pixels | CDATA | #IMPLIED | height of digital image (pixels) |
| Width (Pixesl0 | CDATA | #IMPLIED | width of digital image (pixels) |
| Resolution__DPI | CDATA | #IMPLIED | digital image resolution (dots per inch) |
| > | | | |
| <!-Digital Audio Metadata Structure-> | | | |
| <!ELEMENT | Audio (audioMetadata, transactionMetadata)> | | |
| <!ELEMENT | audioMetadata (#PCDATA)> | | |
| <! ATTLIST | audioMetadata | | |
| AID | CDATA | #REQUIRED | asset id |
| PID | CDATA | #REQUIRED | product ID |
| CID | CDATA | #REQUIRED | contract id |

-continued

```
<! -DTD FOR DIGITAL ASSETS ->
<! -Digital Library Data Definition ->
<! -Supporting technologies include but not limited to XML, XSL, XSLT, XPATH, DTD
Schema->

Title                     CDATA   #IMPLIED    audio title
Music                     CDATA   #IMPLIED    yes or no
Stock                     CDATA   #IMPLIED    yes or no
Stock_Library             CDATA   #IMPLIED    music library information
Stock_Sub_Library         CDATA   #IMPLIED    audio library tracking information
Stock_CD_Nbr              CDATA   #IMPLIED    CD ID number
Stock_CD_Title            CDATA   #IMPLIED    CD title information
Stock_Track_Title         CDATA   #IMPLIED    audio track information
Stock_Duration            CDATA   #IMPLIED    length of media section
Stock_Composer            CDATA   #IMPLIED    music composer information
Stock_Publisher           CDATA   #IMPLIED    publishing party (ex. Warner, etc.)
Stock_Society             CDATA   #IMPLIED    (ex. ASCAP, etc.)
Original                  CDATA   #IMPLIED    yes or no
Original_Code             CDATA   #IMPLIED    x
Original_Session_Date     CDATA   #IMPLIED    date of recording
Original_Composer         CDATA   #IMPLIED    music composer information
Original_Publisher        CDATA   #IMPLIED    party of publisher (ex. Warner, etc.)
Original_Society          CDATA   #IMPLIED    x
Rights_Issues             CDATA   #IMPLIED    contract information (ex. Rights,
                                              Permissions)
Contract_License          CDATA   #IMPLIED    yes or no
Internet                  CDATA   #IMPLIED    yes or no
International             CDATA   #IMPLIED    yes or no
Library_Contact           CDATA   #IMPLIED    contact person
>
<!-Long Form Movie Metadata Structure->
<!ELEMENT                 Movie (movie_FormatMetadata, TransactionMetadata)>
<!ELEMENT                 movie_FormatMetadata (#PCDATA)>
<! ATTLIST                movie_FormatMetadata
SAP                       CDATA   #IMPLIED    yes or no; secondary audio program (ex.
                                              Spanish)
P_Version_Format          CDATA   #IMPLIED    refers to the format information (PRIME
                                              Table)
Transmission_Format       CDATA   #REQUIRED   digital format (ex. MPEG, Quicktime,
                                              etc.)
Storage_Capacity          CDATA   #IMPLIED    storage requirements for digital
                                              transmission data
Unit_of_Measure_of_       CDATA   #IMPLIED    (ex. Megabytes MB, Gigabytes GB,
Capacity                                      Terabytes TB)
Compression_Status        CDATA   #REQUIRED   bit rate information
ESP                       CDATA   #REQUIRED   yes or no
Closed_Caption            CDATA   #IMPLIED    yes or no
Sound                     CDATA   #IMPLIED    (ex. Stereo, Mono, Dolby, Dolby Digital,
                                              Dolby)
>
```

Example 2 below shows a sample XML document generated as part of a photographic asset search.

EXAMPLE 2

```
(filename: sample.xml)
<?xml version='1.0' standalone='no'?>
<DAL>
<Asset>
<Assetmetadata PID="200000" AssetTitle="Chaos Factor"
Comments="Soldiers talking to man">
</Assetmetadata>
<Photo>
<Photometadata Resolution="72 dpi"
Talent="Unknown">
</Photometadata>
</Photo>
<Content>chaos_1_t.jpg
</Content>
</Asset>
<Asset>
```

-continued

```
<Assetmetadata PID="141896" AssetTitle="If walls could
talk 2" Comments="An HBO Films trilogy examining the
lesbian experience in America in three different decades">
</Assetmetadata>
<Photo>
<Photometadata Resolution="72 dpi" Talent="Ellen Degeneres">
</Photometadata>
</Photo>
<Content>walls_2_t.jpg
</Content>
</Asset>
<Asset>
<Assetmetadata PID="300000" AssetTitle="Sex and the city"
Comments="Close up portrait of Sarah JessicaParker">
</Assetmetadata>
<Photo>
<Photometadata Resolution="72 dpi" Talent=Sarah and cast">
</Photometadata>
</Photo>
<Content>sex_city_2_t.jpg
</Content>
</Asset>
```

-continued

```
<Asset>
<Assetmetadata PID="141897" AssetTitle="If walls could
talk 2" Comments=" An HBO Films trilogy examining the
lesbian experience in America in three different decades">
</Assetmetadata>
<Photo>
<Photometadata Resolution="72 dpi" Talent="Ellen Degeneres">
</Photometadata>
</Photo>
<Content>walls__5__t.jpg
</Content>
</Asset>
</DAL>
```

XSL operates on XML search output. The output from XSL may be either HTML or XML both with CSS. Known software engines, such as, for example, a software engine known as XT developed by James Clark (see http://jclark.com/xml/xt.html for more details), can be used to convert XML into HTML. A sample command for doing such is: C:>XT sample.xml css.xsl output2.xml. This command generates an XML document named output2.xml, which can be displayed using standard browser software.

Example 3a shows a sample XSL script. Example 3b shows a sample HTML document generated by XSL on the XML search output of Example 2. Example 3c shows a sample XML document with CSS also generated by XSL on the XML search output of Example 2.

EXAMPLE 3a

```
<?xml version="1.0"?>
<xsl:stylesheet version="1.0"
xmlns:xsl="http://www.w3.org/1999/XSL/Transform">
<xsl:template match="/">
<xsl:apply-templates/>
</xsl:template>
</xsl:template match="/DAL/Asset">
<TABLE WIDTH="100%" BORDER="1"><TR><TD HEIGHT="288">
<B>PID:</B><xsl:value-of select-Assetmetadata/@PID/><BR/>
<B>Asset Title: </B><xsl:value-of
select="Assetmedatada/@AssetTitle"/><BR/>
<B>Comments:</B><xsl:value-of
select="Assetmetadata/@Comments"/><BR>
<B>Resolution:</B><xsl:value-of
select="Photo/Photometadata/@Resolution"/><BR/>
<B>Talent:</B><xsl:value-of
select="Photo/Photometadata/@Talent"/><BR/>
</TD><TD WIDTH="288" HEIGHT="288">
<xsl:apply-templates/>
</TD></TR>
<TABLE>
</xsl:template>
<xsl:template match="/DAL/Asset/Content">
<P><A
href="{concat('full__',ancestor::Asset/Content)}"><img
src="{ancestor::Asset/Content}" border="0"/>
</A></P>
</xsl:template>
</xsl:stylesheet>
```

EXAMPLE 3b

```
<HTML>
<TABLE WIDTH="100%" BORDER="1"><TR>
```

-continued

```
<TD HElGHT="288">
<B>PID: </B>200000<BR/>
<B>Asset Title:</B>Chaos Factor<BR/>
<B>Comments:</B>Soldiers talking to man<BR/>
<B>Resolution:/B> 72 dpi<BR/>
<B>Talent:</B>Unknown<BR/>
</TD> .TD WIDTH="288" HEIGHT="288">
<P><A href="full__chaos__1__t.jpg"<>img
src="chaos__l__t.jpg" border="0"/></A></P></TD>
</TR></TABLE>
<TABLE WIDTH="100%" BORDER="1"><TR>
<TD HEIGHT="288">
<B>PID: </B>141896<BR/>
<B>Asset Title:</B>If walls could talk 2<BR/>
<B>Comments:</B>An HBO Films trilogy examining the lesbian
experience in America in three different decades<BR/>
<B>Resolution:</B> 72 dpi<BR/>
<B>Talent:</B>Ellen Degeneres<BR/></TD>
<TD WIDTH="288" HEIGHT="288">
<P><A href=full__walls__2__t.jpg"><img
src="walls__2__t.jpg"border="0"/></A></P></TD>
</TR></TABLE>
<TABLE WTDTH="100%" BORDER="1"><TR>
<TD HEIGHT="288"><B>PID: </B>300000<BR/>
<B>Asset Title:</B>Sex and the city<BR/>
<B>Comments:</B>Close up portrait of Sarah Jessica Parker<BR/>
<B>Resolution:</B> 72 dpi<BR/>
<B>Talent:</B>Sarah and cast<BR/></TD>
<TD WTDTH="288" HEIGHT="288">
<P><A href="full__sex__city__2__t.jpg"><img
src="sex__city__t.jpg" border="0" /></ A></P>
</TD></TR></TABLE>
<TABLE WIDTH="100%" BORDER="1"><TR>
<TD HEIGHT="288">
<B>PID: </B>141896<BR/>
<B>Asset Title:</B>If walls could talk 2<BR/>
<B>Comments:</B>An HBO Films trilogy examining
the lesbian experience in America in three different decades<BR/>
<B>Resolution:</B> 72 dpi<BR/>
<B>Talent:</B>Ellen Degeneres<BR/></TD>
<TD WIDTH="288" HEIGHT="288">
<P><A href="full__walls__5__t.jpg">
<imgsrc="walls__5__t.jpg" border="0"/></ A></P> </TD>
</TR></TABLE>
</HTML>
```

EXAMPLE 3c

```
(filename: css.xml)
<?xml version=1.0"?>
<xsl:stylesheet version="1.0"
xmlns:xsl="http://www.w3.org/1999/xsl/transform">
<xsl:template match="/">
<xsl:processing-instruction name="xml-stylesheet">type="text/css"
href="#photos"
</xsl : processing-instruction>
<xsl:apply-templates select="DAL"/>
<xsl:template>
<xsl:template match=".">
<xsl:copy><xsl:value-of select="."/></xsl:copy>
</xsl:template>
<xsl:template match="DAL">
<style id=photos">
Asset
{display: block; position:relative;width:100%;height:225px;
border:inset3px gray;}
Assetmetadata {display:inline;font-size:14pt;}
Photo {display:inline;font-size:12pt;}
Photometadata {display:inline;font-size: 12pt;}
Content
{width:72 px; height:72px;position:relative;display:block;float:left;}
<xsl:for-each select="//Asset">Content[photo<xs1:value-of
select="@PID"/>]
```

-continued

```
{background-image:url(<xsl:value-of select="Content"/>);}
</xsl:for-each>
</style>
<xsl:apply-templates select="Asset"/>
</xsl:template>
<xsl:template match="/DAL/Asset/Content">
<Content id ="{concat(Photo',
sibling::Assetmetadata/@PID)}
href="{sibling::Asset/Content}"/>
</xsl:template>
<xsl:template match="/DAL/Asset">
<TABLE WIDTH="100%" BORDER="1"><TR><TD HEIGHT="288">
<B>PID: </B><xsl:value-of select=Assetmetadata/@PID/><BR/>
<B>Asset Title:</B>
<xsl:value-of select="Assetmetadata/@AssetTitle"/><BR/>
<B>Comments:</B><xsl:value-of
select="Assetmetadata/@Comments"/><BR/>
<B>Resolution:</B><xsl:value-of
select="Photo/Photometadata/@Resolution"/><BR/>
<B>Talent:</B><xsl:value-of
select=Photo/Photometadatal@Talent"/>< BR/>
</TD>
<TD WIDTH="288" HEIGHT="288">
<xsl:apply-templates />
</TD>
</TR></TABLE>
</xsl:template>
<xsl:template match="/DAL Asset/Content">
<P><A
href={"concat('photo',sibling::asset/content)}">
<img src="{ancestor::Asset/Content}" border="0"/>
</A></P>
</xsl:template>
</xsl:stylesheet>
```

Thus it is seen that XML data definitions for digital assets are provided that can be used as a standardized dictionary for application and platform independent exchange and repurposing of those assets. One skilled in the art will appreciate that the present invention can be practiced by other than the described embodiments, which are presented for purposes of illustration and not of limitation, and the present invention is limited only by the claims which follow.

We claim:

1. A computer readable storage medium storing computer-executable instructions that are executed by a computer for performing steps of:

storing data in a memory, the data comprising a server application program and only one single document type definition (DTD) for use in storing, retrieving, searching, or tracking at least three different types of digital assets stored in a single database, each digital asset of the digital assets includes content and metadata, the metadata includes rights management information, the server application program including modules for a parser, a query language utility, and a style sheet processor;

receiving a demand containing user entered search parameters for information pertaining to the at least three different types of the digital assets;

accessing the DTD that defines declared elements for the at least three different types of the digital assets, wherein the DTD further defines elements and attributes for rights management of the at least three different types of the digital assets, the at least three different types of the digital assets including photographs, audio recordings and at least one of promo, video recordings, and voiceover digital assets, wherein the rights management elements and attributes comprise metadata for at least one of: a contract identifier, an availability start date, an availability end date, an allowed number of plays per agreement, a copyright holder identifier, and a worldwide rights identifier, wherein the DTD defines metadata for the photographs and metadata attributes for the photographs metadata, the photographs metadata attributes comprising at least one of a definition for black/white, a definition for color, a definition for caption, and a definition for legal restrictions, wherein the DTD defines metadata for the audio recordings and metadata attributes for the audio recordings metadata, the audio recordings metadata attributes comprising a definition for rights issues regarding use of an audio recording;

converting, by using the query language utility, the demand containing user entered search parameters for information pertaining to the digital assets into a query to be transmitted to the database, wherein the query language utility is a structured query language (SQL) utility and the style sheet processor is an extensible style sheet language (XSL) processor;

searching the at least three different types of the digital assets based on the converted demand and the accessed DTD; and converting, by using the style sheet processor, search results returned from the database into a style sheet for input to a client application and displaying the converted search results to a user.

2. A method for retrieving and tracking different types of assets, the method comprising:

storing data in a memory that is read by a computer, the data comprising a server application program and only one single document type definition (DTD) for use in storing, retrieving, searching, or tracking at least three different types of digital assets stored in a single database, each digital asset of the digital assets includes content and metadata, the metadata includes rights management information, the server application program includes modules for a parser, a query language utility, and a style sheet processor;

receiving a demand containing user entered search parameters for information pertaining to the at least three different types of the digital assets;

accessing the DTD that defines declared elements for the at least three different types of the digital assets by executing the server application program, wherein the DTD further defines elements and attributes for rights management of the at least three different types of the digital assets, the at least three different types of the digital assets including photographs, audio recordings and at least one of promo, video recordings, and voiceover digital assets, wherein the rights management elements and attributes comprise metadata for at least one of: a contract identifier, an availability start date, an availability end date, an allowed number of plays per agreement, a copyright holder identifier, and a worldwide rights identifier, wherein the DTD defines metadata for the photographs and metadata attributes for the photographs metadata, the photographs metadata attributes comprising at least one of a definition for black/white, a definition for color, a definition for caption, and a definition for legal restrictions, wherein the DTD defines metadata for the audio recordings and metadata attributes for the audio recordings metadata, the audio recordings metadata attributes comprising a definition for rights issues regarding use of an audio recording;

converting, by using the query language utility, the demand containing user entered search parameters for information pertaining to the digital assets into a query to be transmitted to the database, wherein the query language utility is a structured query language (SQL) utility and the style sheet processor is an extensible style sheet language (XSL) processor;

searching the at least three different types of the digital assets based on the converted demand and the accessed DTD; and converting, by using the style sheet processor, search results returned from the database into a style sheet for input to a client application and displaying the converted search results to a user.

3. A computer system for retrieving assets, the system comprising:

a server comprising application software and a single database, the database storing a plurality of digital assets of different types, the different types including photographs, movies, audio recordings, video recordings, graphics, and text documents, each digital asset of the digital assets comprising content and metadata, the metadata comprising rights management information, the application software includes modules for a parser, a query language utility, and a style sheet processor;

a first computer readable storage medium comprising only one single document type definition (DTD) accessible by the server application software, the DTD defining data structure of each different type of the digital assets stored in the database;

a second computer readable storage medium comprising search and retrieval software for searching and retrieving one or more of the different types of the digital assets from the database and further comprising computer-executable instructions that are executed by a computer to:

receive a demand containing user entered search parameters for information pertaining to at least three different types of the digital assets;

access the DTD that defines declared elements for the at least three different types of the digital assets, wherein the DTD further defines elements and attributes for rights management of the at least three different types of the digital assets, the at least three different types of the digital assets including the photographs, the audio recordings and at least one of promo, video recordings, and voiceover digital assets, wherein the rights management elements and attributes comprise metadata for at least one of: a contract identifier, an availability start date, an availability end date, an allowed number of plays per agreement, a copyright holder identifier, and a worldwide rights identifier, wherein the DTD defines metadata for the photographs and metadata attributes for the photographs metadata, the photographs metadata attributes comprising at least one of a definition for black/white, a definition for color, a definition for caption, and a definition for legal restrictions, wherein the DTD defines metadata for the audio recordings and metadata attributes for the audio recordings metadata, the audio recordings metadata attributes comprising a definition for rights issues regarding use of an audio recording;

convert, by using the query language utility, the demand containing user entered search parameters for information pertaining to the digital assets into a query to be transmitted to the database, wherein the query language utility is a structured query language (SQL) utility and the style sheet processor is an extensible style sheet language (XSL) processor;

search the at least three different types of the digital assets based on the converted demand and the accessed DTD; and convert, by using the style sheet processor, search results returned from the database into a style sheet for input to a client application and displaying the converted search results to a user.

* * * * *